Oct. 7, 1958 J. G. WELLS ET AL 2,855,261

EQUIPMENT CABINET STRUCTURE

Filed Nov. 26, 1956 2 Sheets-Sheet 1

INVENTORS
James G. Wells
Herbert C. Golz
By: Olson & Trexler attys.

Oct. 7, 1958 J. G. WELLS ET AL 2,855,261

EQUIPMENT CABINET STRUCTURE

Filed Nov. 26, 1956 2 Sheets-Sheet 2

INVENTORS
James G. Wells
Herbert C. Golz
By: Olson & Trexler
attys

United States Patent Office 2,855,261

Patented Oct. 7, 1958

2,855,261

EQUIPMENT CABINET STRUCTURE

James G. Wells, Chicago, and Herbert C. Golz, Aurora, Ill., assignors to Elgin Metalformers Corporation, Elgin, Ill., a corporation of Illinois Application November 26, 1956, Serial No. 624,437

9 Claims. (Cl. 312—257)

The present invention relates to a novel enclosure or cabinet structure, and, more particularly, to a novel cabinet structure for electrical or electronic equipment or the like.

Various industries are utilizing increasing amounts of electrical and electronic equipment which must be enclosed in a cabinet or the like. Frequently, it is desirable to provide such a cabinet with a laterally extending shelf-like portion which may be used as a writing top so that an operator may work directly at the location of the equipment or instruments he is controlling or observing, or alternatively such a shelf-portion may be required for supporting an electrical chassis or other component of the equipment. Since various installations of electrical equipment, instruments and the like may vary greatly as to the size, number and arrangement of their components, the requirement as to space and arrangement of elements in a cabinet or enclosure for each installation of electrical equipment or the like may also vary greatly. Therefore, an object of the present invention is to provide a novel cabinet or enclosure structure having a laterally extending shelf portion, which structure comprises certain basic elements which may be easily adjusted, re-arranged and modified so as to adapt the structure for the requirements of many different installations.

A further object of the present invention is to provide a novel cabinet or enclosure structure of the above described type which may be relatively economically manufactured and assembled and which is sufficiently strong and rigid to provide the desired protection for the electrical equipment or the like to be supported thereby.

A more specific object of the present invention is to provide a cabinet structure of the above described type having a shelf portion which is extremely strong and rigid and which may be easily detachably connected with the cabinet structure in a manner which enables the structure to accommodate various pieces of equipment, and which shelf means may be utilized as a writing top or the like or may be easily modified so as to accommodate additional pieces of equipment.

Other objects and advantages of the present invention will become apparent from the following description and the accompanying drawings wherein.

Figures 1, 2, 3, 4, 5:
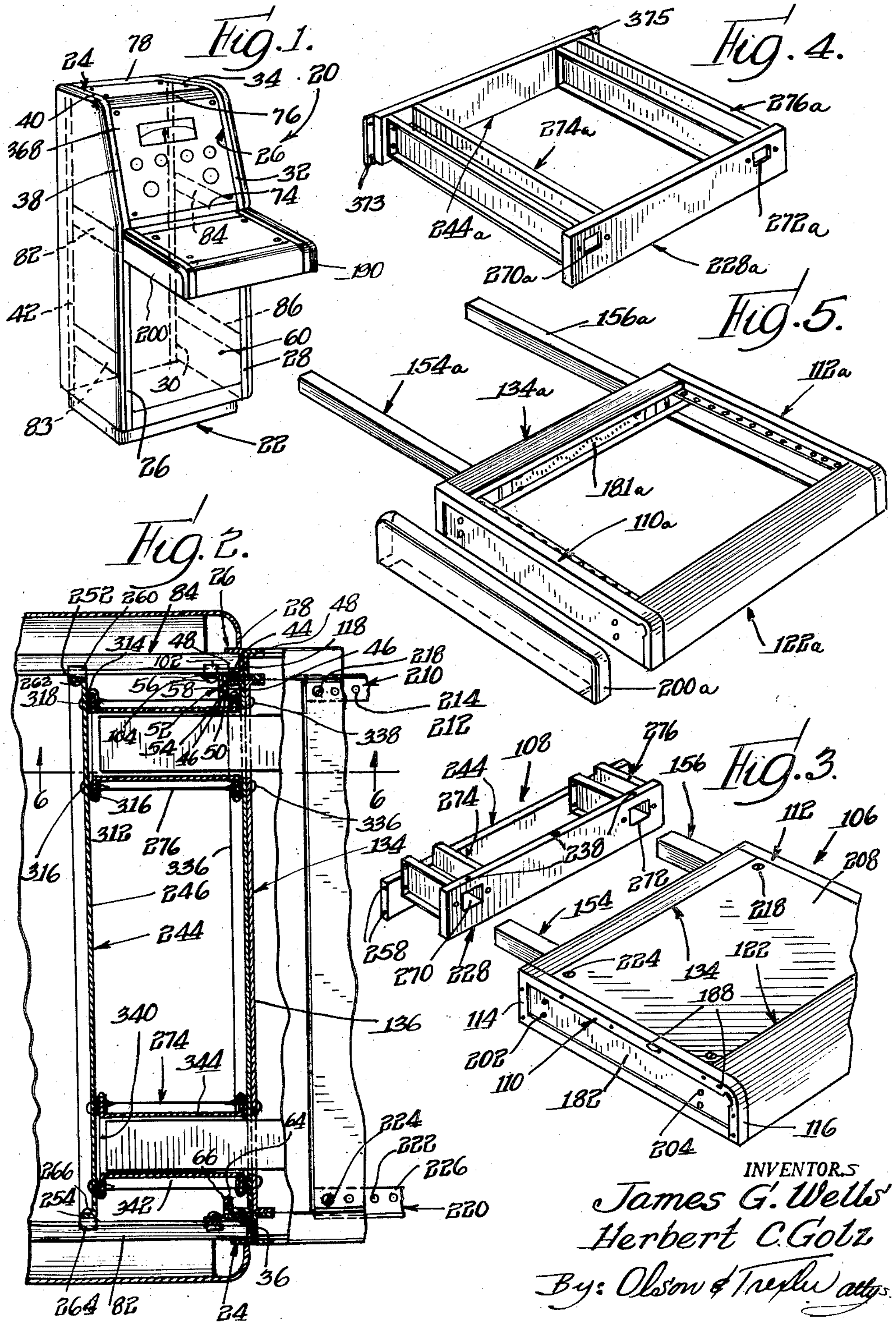
Fig. 1 is a perspective view showing a cabinet structure incorporating the features of the present invention.
Fig. 2 is an enlarged fragmentary partial horizontal sectional view taken along line 2—2 in Fig. 6.
Fig. 3 is an exploded perspective view showing a shelf portion of the structure and means for mounting the shelf portion within the cabinet.
Fig. 4 is a perspective view showing a modified shelf support assembly adapted to be mounted within a cabinet.
Fig. 5 is a perspective view showing a slightly modified shelf portion adapted to be mounted on the support shown in Fig. 4.

Referring now mode specifically to the drawings wherein like parts are designated by the same numerals throughout the various figures, a cabinet structure 20 incorporating the features of the present invention includes a base generally designated by the numeral 22 to which are secured lower end portions of opposite side frame members 24 and 26. Each of these frame members is preferably formed from a single length of steel channel stock material having inturned flanges and a generally U-shaped cross section as shown in Fig. 2. The frame member 26 provides a pair of upstanding corner portions 28 and 30 respectively located at the front and back of the cabinet (see Figs. 1, 2, 6 and 10). In addition, the frame member 26 has a rearwardly inclined portion 32 extending upwardly from the front corner portion 28 and a top horizontal portion 34. The frame member 24 is identical to the frame member 26 and includes a front corner portion 36, a front inclined portion 38, a top horizontal portion 40 and a back upstanding corner portion 42.

Figures 6, 7, 8, 9, 10:
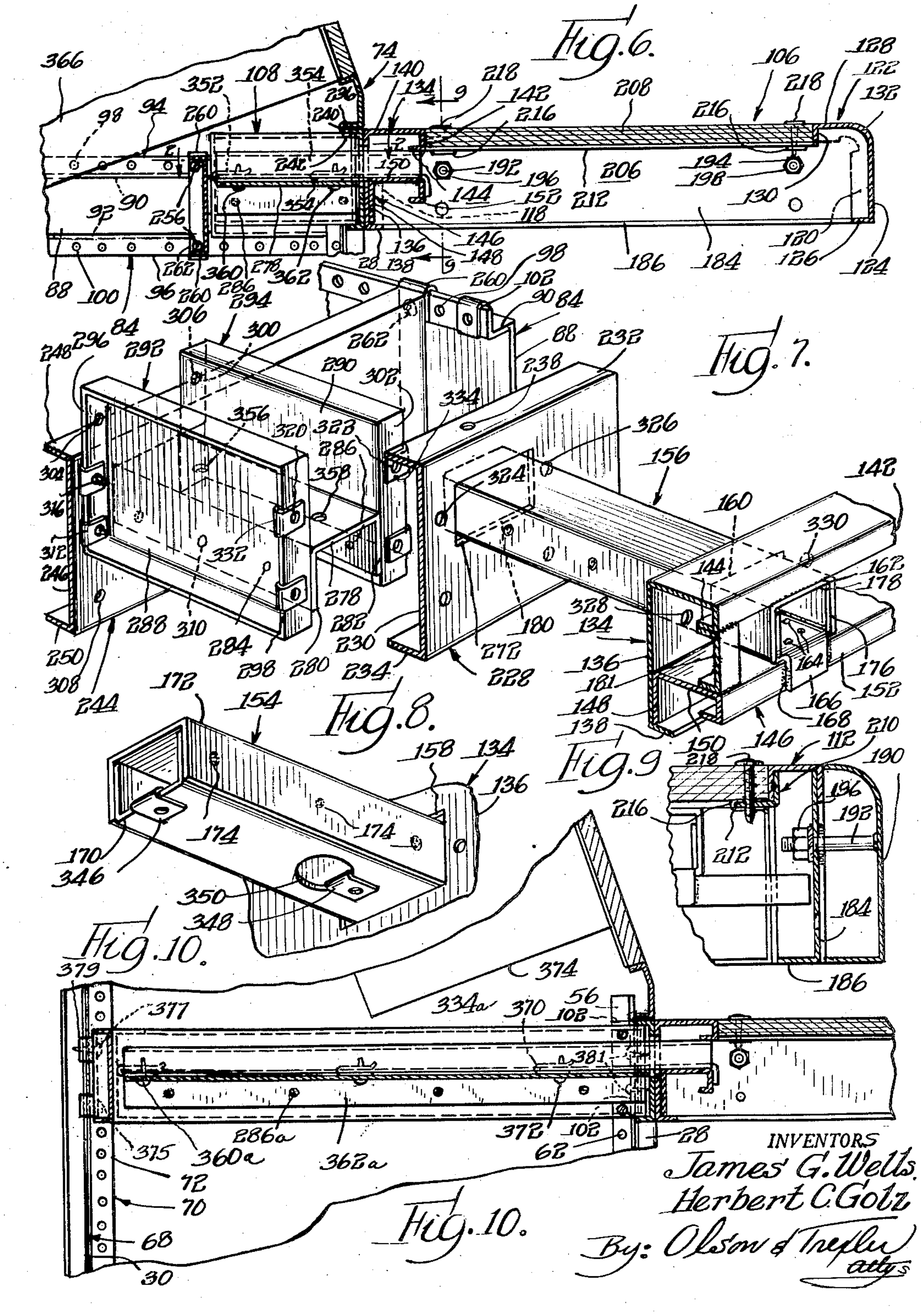
Fig. 6 is a fragmentary sectional view taken along line 6—6 in Fig. 2.
Fig. 7 is an enlarged fragmentary and partially exploded perspective view of a portion of the shelf and support means therefor shown in Figs. 2, 3 and 6.
Fig. 8 is a fragmentary perspective view showing a portion of the shelf structure.
Fig. 9 is an enlarged fragmentary sectional view taken along line 9—9 in Fig. 6.
Fig. 10 is a fragmentary sectional view similar to Fig. 6 but showing the shelf structure and support means therefor illustrated in Figs. 4 and 5.

As shown in Figs. 2, 6 and 10, a flange 44 of an upstanding angle iron 46 extends within a flange 48 of the front corner portion 28 so that the other flange 50 of the angle iron 46 extends laterally from the corner member toward the opposite side of the cabinet. A second angle iron 52 is disposed in back-to-back relationship with the angle iron 46 and has a flange 54 welded to the flange 50 and a second flange 56 extending rearwardly of the cabinet structure from the upstanding corner portion 28.

The flanges 50 and 54 are provided with a series of vertically spaced aligned apertures 58 for receiving screws or similar fastening devices, not shown, used to secure a front panel 60 in place. Similarly, the flange 56 is provided with a series of apertures 62 which are vertically spaced from each other predetermined equal amounts. Substantially identical but oppositely disposed angle irons 64 and 66 are secured to each other and are adjacent the upstanding corner post 36 of the frame member 24 and it is believed that these angle irons need not be described in detail. A similar pair of angle irons 68 and 70 are secured to each other and are disposed at the back upstanding corner or post portion 30 if the frame member 26 as shown in Fig. 10. These angle irons are also provided with apertures arranged in the same manner as the apertures 58 and 62 mentioned above, the apertures 72 shown in Fig. 10 in the flange of the angle iron 70 corresponding to the abovementioned aperture 62. The cabinet structure is also provided with another pair of angle irons, not shown, which are identical to but oppositely arranged with respect to the angle irons 68 and 70 and are adjacent to the back corner post 42 of the frame member 24.

The main frame of the cabinet structure includes a front transverse frame member 74 which extends between and is permanently secured to the upper ends of the front corner members or posts 28 and 36. Additional transverse members 76 and 78 extend between and are secured to the top portions 34 and 40 of the side frame members 26 and 24, respectively. Upper and lower horizontal side frame members 82 and 83 extend between one pair of front and back upstanding corner post structures and are welded to flanges of channel members of these corner post structures, and additional upper and lower horizontal side frame members 84 and 86 extend between and are connected to the opposite side front and back corner post structures. Since all of these horizontal side frame members are identical and are mounted in the same manner, only the side frame member 84 which is shown in Figs. 2, 6, 7 and 10 will be described in detail. More specifically, the channel-shaped frame member 84 includes a vertically disposed and horizontally extending web portion 88 having flanges 90 and 92 extending inwardly of the cabinet structure from its upper and lower margins respectively. The flange 90 terminates in an upwardly extending flange 94 and the flange 92 terminates in a depending flange 96. The flanges 94 and 96 are provided with series of horizontally spaced apertures 98 and 100 respectively. As shown in Figs. 2, 7 and 10, a U-shaped sheet metal nut member 102 is applied to each end portion of each of the flanges 94 and 96 so that one nut member is in alignment with each endmost aperture of the series of apertures 98 and 100. The side frame member 84 is positioned against the outwardly facing surfaces of the front and back corner post structure flanges 56 and 70, which flanges are detachably connected to the member 84 by a plurality of screws 104 which extend through apertures 62 and 72 and engage the nut members 102 which are aligned with these apertures.

The cabinet structure 20 includes a shelf 106, and a support assembly 108 adapted to be detachably mounted within the cabinet for supporting the shelf. The shelf 106 comprises a pair of opposite side frame members 110 and 112 each of which has an inverted U-shaped transverse cross section as shown in Figs. 2 and 9. The frame member 110 is provided with opposite end depending leg portions 114 and 116 and the frame member 112 is provided with similar opposite end leg portions 118 and 120. A front transverse frame member 122 extends between and is welded to outer end portions of the side frame members 110 and 112, which transverse member 122 includes a vertical web portion 124 having an inturned flange 126 extending from its lower margin and a horizontal web portion 128 terminating in a depending flange 130 and preferably integrally joined to the vertical web portion by a curved portion 132. A somewhat similar transverse frame member 134 extends between and is welded or otherwise secured to inner end portions of the side frame members 110 and 112. This transverse member includes a vertical web portion 136 having a horizontal flange 138 extending from its lower margin, and a horizontal web portion 140 joined directly to the upper margin of the vertical web portion and having a depending flange 142 which terminates in a rearwardly extending horizontal flange 144. The shelf is supported from its rear marginal portion in the manner described more fully below, and in order to rigidify the rear marginal portion without unduly increasing the weight of the shelf, a transverse member 146 is disposed within and secured to the transverse member 134. More specifically, the member 146 includes a depending portion 148 welded to the vertical web portion 136 of the member 134, and a horizontal portion 150 which is spaced a predetermined distance below the inturned flange 144 and terminates in a downwardly and then rearwardly extending flange 152. A pair of shelf supporting arms 154 and 156 is provided, which arms respectively extend rearwardly through apertures 158 and 160 in the vertical web portion 136 of the transverse member 134. The arm 156 is welded to the flange 144 as indicated at 162 and also to the horizontal portion 150 of the member 146 as indicated at 164 in Fig. 7. In addition, the arm 156 is provided with a depending tab 166 which extends along the flange 152 and is welded thereto as indicated at 168 so as to relieve any transverse or shearing strains which might otherwise be applied to the welds 162 and 164. The support arms 154 and 156 are of built-up box-like construction so as to provide great strength and rigidity. More specifically, the arm 154 comprises a channel member 170 of U-shaped cross section and an inverted channel member 172 having its depending flanges welded to the upstanding flanges of the channel member 170 as at 174. The arm 156 similarly includes a channel member 176 and an inverted channel member 178 welded to the bottom channel member 176 as at 180. A channel member 181 is welded to the flange 144 and the web portion 150 between the support arms for further rigidifying the rear margin of the shelf.

Side members 182 and 184 are respectively mounted within the opposite side frame members 110 and 112 of the shelf, which side members have inturned lower marginal flanges as indicated by the flange 186 of the member 184 shown in Figs. 6 and 9 and which side members are welded to the horizontal and depending leg portions of the side frame members as indicated by the spot welds 188 shown in Fig. 3. For appearance purposes, a side panel 190 may be provided along the side member 184, which side panel has a pair of studs 192 and 194 butt-welded thereto and adapted to extend through apertures in the side member 184 and to receive nut members 196 and 198 for securing the side panel in position. A similar side panel 200 may be secured in the same manner to the opposite side member 182 which is provided with apertures 202 and 204 for receiving side panel connecting studs.

The side and transverse members of the shelf define a central rectangular opening 206 which is adapted to receive a panel 208 that may be used as a writing top or for any other desired purpose, or, alternatively, a piece of electrical or other equipment may be installed in this opening. In order to support the panel 208 or any piece of equipment mounted in the well of the shelf, an angle iron 210 is welded to the shelf frame member 112 so that a horizontal flange 212 thereof projects into the well as shown best in Figs. 2, 6 and 9. A series of apertures 214 is provided in the flange 212. Sheet metal nut members 216 are applied to the flange 212 preferably in alignment with the endmost apertures 214 for receiving screws 218 extending through the panel 208. An angle iron 220 which is identical to the angle iron 210 is welded to the opposite side frame member 110 of the shelf for supporting the opposite margin of the panel 208 or other piece of equipment. This angle iron is also provided with a series of apertures 222 for receiving securing screws 224 extending through the panel 208 and into nut members on the inwardly extending flange 226 of the angle iron. It will be appreciated that the manner in which the supporting arms 154 and 156 are connected to the shelf leaves the central portion or well of the shelf open so that the shelf is adapted to accommodate various pieces of equipment.

The shelf support assembly 108 includes a front transverse channel member 228 having a vertical web portion 230 and upper and lower inturned marginal flanges 232 and 234. As shown in Figs. 6 and 7, the transverse member 228 is adapted to be secured to and beneath the transverse frame member 74 which is provided with a lower marginal inturned flange 236. More specifically, as shown in Fig. 3, spaced apertures 238 are provided in the upper flange 232 of the transverse member for alignment with similar apertures in the flange 236 of the member 74. U-shaped nut members 240 are applied to the flange 236 in alignment with the apertures therein, and screws 242 are applied to the nut members through the apertures 238 for detachably securing the transverse member 228. A second and rearwardly disposed transverse member 244 is provided for the shelf support assembly 108, which member includes a vertical web portion 246, upper and lower inturned marginal flanges 248 and 250 and opposite end inturned flanges 252 and 254. The opposite end flanges are respectively provided with pairs of vertically spaced apertures 256 and 258 which are adapted to register with apertures in the upper and lower series of apertures in the side frame members 84 and 82, respectively. As shown in Figs. 2, 6 and 7, sheet metal nut members 260 are applied to the upper and lower flanges 94 and 96 of the frame member 84 in alignment with selected apertures for accommodating screws 262 applied through the apertures 256 in the flange 252 for detachably connecting the transverse member 244 to the frame member 84. Similar nut members 264 and screws 266 are associated with the opposite side frame member 82 and the opposite end flange 254 of the member 244 for detachably securing the member 244 to the side frame member 82.

The transverse member 228 is provided with a pair of spaced openings 270 and 272 through which the support arms 154 and 156 may be inserted, and the support assembly 106 is provided with a pair of sub-assemblies 274 and 276 respectively aligned with the openings 270 and 272 for receiving and restraining the support arms. The sub-assembly 276 which is shown in Figs. 2, 3, 6 and 7 comprises an inverted channel member 278 having its depending flanges 280 and 282 welded as at 284 and 286 to lower portions of vertical web sections 288 and 290 of oppositely disposed channel members 292 and 294. The channel members 292 and 294 are respectively provided with opposite end flanges 296—298 and 300—302 which are adapted to abut substantially the vertical web portions of the transverse members 228 and 244. In order to vertically adjustably and detachably connect the members 292 and 294 to the transverse member 244, series of uniformly vertically spaced apertures 304 and 306 are provided in the end flanges 296 and 300, which apertures are adapted to align with selected apertures 308 and 310 of series of vertically spaced apertures formed in the transverse member 244. Sheet metal nut members 312 and 314 are applied to the end flanges 298 and 300 for receiving screws 316 and 318 applied through the apertures in the member 244. Similar apertures 320 and 322 are provided in the end flanges 298 and 302 for alignment with apertures 324 and 326 and 328 and 330 in the transverse member 228 of the support assembly and the transverse member 134 of the shelf, respectively. Nut members 332 and 334 are applied to the flanges 298 and 302 for receiving screws 336 and 338 respectively inserted through apertures 328—324 and apertures 330—326. The sub-assembly 274 is identical to the sub-assembly 276 and, therefore, it suffices to state that the sub-assembly 274 includes an inverted channel member 340 and opposite side channel members 342 and 344.

The support arms 154 and 156 of the shelf structure are detachably secured to the inverted channel members 340 and 278 of the sub-assemblies 274 and 276, respectively in the manner shown best in Figs. 6, 7 and 8. More specifically, Fig. 8 clearly shows a sheet metal nut member 346 applied over the inner end of a bottom section of the arm 154 for alignment with an aperture in the bottom section, and a second sheet metal nut member 348 applied over a margin of an enlarged opening 350 formed in the bottom section for alignment with a second aperture in the bottom section. Sheet metal nut members 352 and 354 are similarly applied to the bottom section of the arm 156. Apertures 356 and 358 are formed in the channel member 278, through which apertures screws 360 and 362 are applied respectively to the nut members 352 and 354. Identical apertures are formed in the inverted channel member 340 for accommodating additional screws, not shown, applied to the nut members 346 and 348 for securing the arm 154 to the inverted channel member 340.

Fig. 6 illustrates one of the advantages of the above described structure for supporting the shelf. More specifically, in certain installations a chassis or the like 366 may extend downwardly and rearwardly from a panel 368 mounted between the inclined frame member portions 32 and 38 of the cabinet structure in the manner shown. In such an installation, the side frame members 82 and 84 and the transverse member 244 are disposed downwardly or, in other words, positioned below the upper plane of the shelf and the sub-assemblies 274 and 276 so as to avoid interference with the chassis 366 or the like.

Figs. 4, 5 and 10 show a slightly modified embodiment of the present invention wherein only the shelf and the support means therefor differ from the structure described above. Thus, in these figures identical reference numerals with the suffix "*a*" have been applied to elements of the shelf and the shelf support assembly which correspond to similar or identical elements of the structure described above. This embodiment differs in that the support arm **154*a* and 156*a* are substantially longer than the above described arms 154 and 156 and also in that the length or depth of the sub-assemblies 274*a* and 276*a* has been increased to accommodate the longer support arm. In view of the increased length of the support arms, an additional nut member 370 and screw 372 may be applied to the arm 156*a* in the same manner as the nut member 354*a* and screw 362*a*, and a similar additional nut member and screw, not shown, may be applied to the arm 154*a*. Also, laterally extending apertured end flanges 373 and 375 are provided on the transverse member 244*a* which are adapted to be vertically adjustably secured to the angle irons of the back corner post means by screws 377 and nut member 379 as shown in Fig. 10. The front transverse member 288*a* is vertically adjustably secured to the angle irons of the front corner post means by screws 381 and complementary nut members. This embodiment may be used to advantage in installations wherein a chassis or piece of equipment 374 which corresponds to the above described chassis 366** is of a size which will avoid interference with the longer support arms and shelf support assembly and wherein greater strength and rigidity for the shelf is desired for supporting a heavy piece of equipment or have any other purpose. Also, the vertical adjustability of the shelf support means enables the shelf to be positioned at any desired height.

While the preferred embodiment of the present invention has been shown and described herein, it is obvious that many structural details may be changed without departing from the spirit and scope of the appended claims.

The invention is claimed as follows:

1. In a cabinet structure of the type described, the combination of first and second pairs of opposite side upstanding front and back cornerpost means, a pair of substantially horizontal opposite side frame members respectively connected to said first and second pairs of front and back cornerpost means, a pair of relatively inwardly and outwardly disposed transverse substantially horizontal members respectively detachably mounted between said side frame members and detachably mounted between said front cornerpost means, a pair of laterally spaced support means extending between and detachably connected to said transverse members, shelf means extending forwardly of said outwardly disposed transverse member, a pair of support arms rigidly secured to said shelf means and extending rearwardly through openings in said outwardly disposed transverse member and along said support means, and fastening means detachably securing said arms to said support means, said inwardly disposed transverse member having a pair of series of vertically spaced apertures therein, each of said support means having aperture means through an inner end portion thereof alignable with selected apertures in said inwardly disposed transverse member, and fastening elements extending through said aperture means and said selected apertures for vertically adjustably securing said support means to said inwardly disposed transverse member.

2. In a cabinet structure of the type described, the combination of first and second pairs of opposite side upstanding front and back cornerpost means, a pair of substantially horizontal opposite side frame members respectively connected to said first and second pairs of front and back cornerpost means, a pair of relatively inwardly and outwardly disposed transverse substantially horizontal members respectively detachably mounted between said side frame members and detachably mounted between said front cornerpost means, a pair of laterally spaced support means extending between and detachably connected to said transverse members, shelf means extending forwardly of said outwardly disposed transverse member, a pair of support arms rigidly secured to said shelf means and extending rearwardly through openings in said outwardly disposed transverse member and along said support means, and fastening means detachably securing said arms to said support means, said shelf means comprising generally rectangular frame means defining a central well, and opposite side apertured flange means projecting inwardly of said well for supporting a member disposed within said well and for receiving fastening elements which secure said last mentioned member within said well.

3. In a cabinet structure of the type described, the combination of first and second pairs of opposite side upstanding front and back cornerpost means, a pair of substantially horizontal opposite side frame members respectively connected to said first and second pairs of front and back cornerpost means, a pair of relatively inwardly and outwardly disposed transverse substantially horizontal members respectively detachably mounted between said side frame members and detachably mounted between said front cornerpost means, a pair of laterally spaced support means extending between and detachably connected to said transverse members, shelf means extending forwardly of said outwardly disposed transverse member, a pair of support arms rigidly secured to said shelf means and extending rearwardly through openings in said outwardly disposed transverse member and along said support means, and fastening means detachably securing said arms to said support means, a rear transverse marginal portion of said shelf means comprising a first transverse frame member having a generally vertically disposed web portion, a generally horizontally disposed web portion extending from an upper margin of said vertically disposed web portion and terminating in depending flange means, and a second transverse frame member having a generally vertically disposed web portion welded to said first mentioned vertically disposed web portion and a generally horizontally disposed web portion spaced a predetermined distance beneath said depending flange means, said support arms having outer terminal end portions extending between and rigidly secured to said depending flange means and said second mentioned horizontal web portion.

4. A combination, as defined in claim 3, wherein said support arms are welded to said depending flange means and said second mentioned horizontal web portion, said second mentioned horizontal web portion terminating in a depending flange, and said arms including tabs depending along and welded to said last mentioned flange.

5. A combination, as defined in claim 3, wherein each of said support arms has a box-like transverse cross sectional shape and is provided by a first generally U-shaped channel member and a second inverted generally U-shaped channel member having depending side flanges welded to upstanding side flanges of said first generally U-shaped channel member.

6. A combination, as defined in claim 5, wherein the fastening means detachably securing said support arms to the support means includes generally U-shaped sheet material nut members applied over margins of enlarged openings in bottom sections of said first mentioned generally U-shaped channel members, and screw members extending through apertures in said support means and engaging said nut members.

7. In a cabinet structure of the type described, the combination of first and second pairs of opposite side upstanding front and back cornerpost means, a pair of substantially horizontal opposite side frame members respectively connected to said first and second pairs of front and back cornerpost means, a pair of relatively inwardly and outwardly disposed transverse substantially horizontal members respectively detachably mounted between said side frame members and detachably mounted between said front cornerpost means, a pair of laterally spaced support means extending between and detachably connected to said transverse members, shelf means extending forwardly of said outwardly disposed transverse member, a pair of support arms rigidly secured to said shelf means and extending rearwardly through openings in said outwardly disposed transverse member and along said support means, and fastening means detachably securing said arms to said support means, said support means and said support arms being relatively short and said inwardly disposed transverse member being located forwardly of the back corner post means and substantially toward said front corner post means so as to minimize any obstruction of the interior of the cabinet structure.

8. In a cabinet structure of the type described, the combination of first and second pairs of opposite side upstanding front and back cornerpost means, a pair of substantially horizontal opposite side frame members respectively connected to said first and second pairs of front and back cornerpost means, a pair of relatively inwardly and outwardly disposed transverse substantially horizontal members respectively detachably mounted between said side frame members and detachably mounted between said front cornerpost means, a pair of laterally spaced support means extending between and detachably connected to said transverse members, shelf means extending forwardly of said outwardly disposed transverse member, a pair of support arms rigidly secured to said shelf means and extending rearwardly through openings in said outwardly disposed transverse member and along said support means, and fastening means detachably securing said arms to said support means, said support means and said support arms extending for substantially the full depth of said cabinet structure and said inwardly disposed transverse member being located adjacent the back corner post means for providing a relatively rigid support for said shelf means.

9. In a cabinet structure of the type described, the combination of first and second pairs of opposite side upstanding front and back cornerpost means, a pair of substantially horizontal opposite side frame members respectively connected to said first and second pairs of front and back cornerpost means, a pair of relatively inwardly and outwardly disposed transverse substantially horizontal members respectively detachably mounted between said side frame members and detachably mounted between said front cornerpost means, a pair of laterally spaced support means extending between and detachably connected to said transverse members, shelf means extending forwardly of said outwardly disposed transverse member, a pair of support arms rigidly secured to said shelf means and extending rearwardly through openings in said outwardly disposed transverse member and along said support means, and fastening means detachably securing said arms to said support means, each of said corner post means including a member having vertically spaced apertures therethrough, and said transverse members being vertically adjustably secured to said corner post members by detachable fastening elements extending through selected apertures in said corner post members.

References Cited in the file of this patent

UNITED STATES PATENTS

| | | |
|---|---|---|
| 2,588,844 | Jones et al. | Mar. 11, 1952 |
| 2,621,995 | Zenner et al. | Dec. 16, 1952 |